(12) United States Patent
Tison et al.

(10) Patent No.: US 7,124,647 B2
(45) Date of Patent: Oct. 24, 2006

(54) SLOTTED FLOW RESTRICTOR FOR A MASS FLOW METER

(75) Inventors: Stuart A. Tison, McKinney, TX (US); Guanghua Wu, Plano, TX (US); Tracy Gill, Richardson, TX (US); Vincent Lopez, Frisco, TX (US)

(73) Assignee: Celerity, Inc., Austin, TX (US)

( * ) Notice: Subject to any disclaimer, the term of this patent is extended or adjusted under 35 U.S.C. 154(b) by 0 days.

(21) Appl. No.: 10/515,328

(22) PCT Filed: May 23, 2003

(86) PCT No.: PCT/US03/16493

§ 371 (c)(1),
(2), (4) Date: Nov. 22, 2004

(87) PCT Pub. No.: WO03/100356

PCT Pub. Date: Dec. 4, 2003

(65) Prior Publication Data

US 2005/0241412 A1    Nov. 3, 2005

(51) Int. Cl.
*G01F 1/37* (2006.01)
(52) U.S. Cl. .................................. 73/861.51
(58) Field of Classification Search ............ 73/861.52, 73/861.54, 861.58
See application file for complete search history.

(56) References Cited

U.S. PATENT DOCUMENTS

| 4,418,723 A | * | 12/1983 | Koni et al. ............... 73/861.52 |
| 6,073,483 A | * | 6/2000 | Nitecki et al. ............. 73/861.52 |
| 6,164,141 A | * | 12/2000 | Chalvignac et al. ..... 73/861.52 |

* cited by examiner

*Primary Examiner*—Harshad Patel
(74) *Attorney, Agent, or Firm*—Lowrie, Lando & Anastasi, LLP

(57) ABSTRACT

A flow restrictor (30) for a mass flow metering device formed of a solid material and slots (32) originating from an outer surface towards inward.

26 Claims, 5 Drawing Sheets

SLOTTED FLOW RESTRICTOR FOR A MASS FLOW METER

FIELD OF THE INVENTION

This invention relates in general to flow restrictors and apparatuses including flow restrictors, and more particularly, to flow restrictors having slots and apparatuses having those flow restrictors and method of forming and using the flow restrictors and apparatuses.

DESCRIPTION OF THE RELATED ART

Mass flow controllers that operate on heat transfer principles have been widely adopted. The mass flow controllers typically have a small diameter tube (for sensing) in parallel with a primary flow path through the controller. Typically, a partial fluid flow blockage along the primary flow path is used to divert some of the fluid flow to the secondary flow path where sensing may occur.

One attempt to address the flow diversion is to use a flow restrictor within a primary flow path. The flow restrictor may be generally cylindrical with a slight taper that may reside within a tube having a similar taper. The flow restrictor may be held in position through a spring-like mounting mechanism. A solid restrictor may not allow enough fluid to flow through the primary flow path or may cause too much turbulence just upstream of the flow restrictor, downstream, or both. This can interfere with the fluid flowing through the secondary flow path having the sensor.

Another attempt to address the problem is to use the flow restrictor as previously described with holes drilled along the length of the flow restrictor. FIG. 1 includes a cross-sectional view of a flow restrictor 10 having generally circular, cylindrical holes 12 extending through it. These circular, cylindrical holes 12 may result in turbulent flow.

Yet another attempt for achieving an acceptable flow restrictor is illustrated with a cross-sectional view in FIG. 2. The flow restrictor 20 includes slots 22 extending along the length of the flow restrictor 20. None of the slots contact the outer surface 24 of the restrictor 20 as shown in FIG. 2. Note that the series of internal slots 22 effectively forms a "central tube" as illustrated by the dashed line 26. Further, the shape of the slots 22 may be a function of pressure during an insertion operation and may be undesired.

SUMMARY OF THE INVENTION

A flow restrictor can enable nearly infinite adjustability for the conductance of fluids within a range of physical displacements that correlate to measurable pressure drops. The restrictor may be constructed of a solid material in which slots originate from the outer surface of the material and progress inward. The flow restrictor can be manufactured and integrated into equipment without the need of significant changes to the other parts of the equipment.

In one set of embodiments, a flow restrictor can comprise a material and a slot. The slot can comprise a depth that extends from an outer surface of the material to a location that is closer to a center point within the solid material.

In another set of embodiments, an apparatus can comprise a flow path and a flow restrictor lying within the first flow path. The flow restrictor can comprise a material and a slot. The slot can comprise a depth that extends from an outer surface of the material to a location closer to a center point within the material.

In still another set of embodiments, a mass flow apparatus can comprise a first flow path, a second flow path, and a flow restrictor lying within a first portion of the first flow path. The flow restrictor can comprise a solid material that has a substantially circular cross-sectional area. The flow restrictor can also comprise a plurality of slots. Each of the slots may have a depth that extends from the outer surface towards a center point of the cross-sectional area. The second flow path can comprise a second portion that provides for a parallel flow path to the first portion of the first flow path within the mass flow controller. The second flow path may be used for measuring flow.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A flow restrictor can comprise a solid material and slots that originate from an outer surface of the material and progress inward. The slots may have depths oriented towards a central axis or other points within the material.

The flow restrictor can be manufactured and integrated into equipment without the need of significant changes to the other parts of the equipment.

The slots have a relatively higher surface area compared to substantially circular holes when the slots and holes have the same volume. The pressure drop due to flow through slots can be higher than the pressure drop due to entrance and exit effects as a fluid flows through the slots. Additionally, an annular volume between the flow restrictor and an inner wall of an apparatus in which both may lie can be approximately as a slot. Therefore, modeling can be performed using a series of slots instead of a more complicated model having a combination of slot(s) and circular hole(s). Still further, a combination of design choices and manufacturing methods can allow nearly infinite adjustability with a range of physical displacements.

Figure 3:
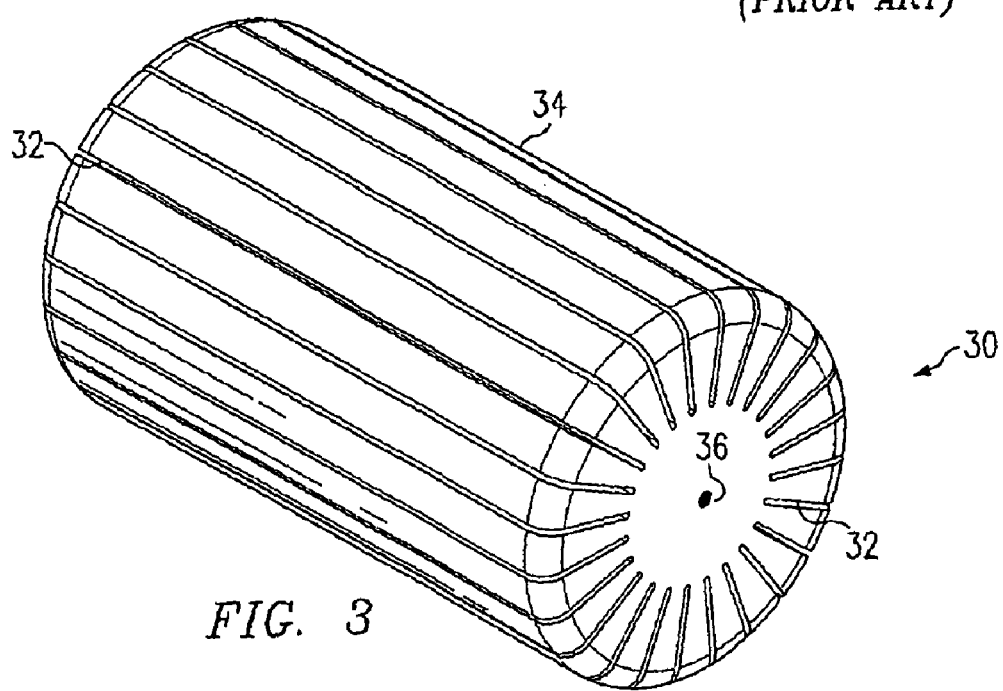
FIG. 3 includes an illustration of a perspective view of a flow restrictor having slots extending from an outer surface toward the center axis of the flow restrictor.

FIG. 3 includes a perspective view of a flow restrictor 30. The flow restrictor 30 may be constructed of a solid material in which slots 32 can be machined and extend from the outer surface 34 and to locations closer to a series a center points 36 (one of which is shown in FIG. 3) that lie along a central axis. The flow restrictor 30 can be made of a material that is substantially inert to a fluid flowing around it. For example, the material may be 316 stainless steel. Other materials may be used. Although not required, the flow restrictor 30 can be a rigid material to reduce the likelihood of the slots 32 changing shape as the pressure used to press it into a mass flow controller or other apparatus changes.

Figure 4:
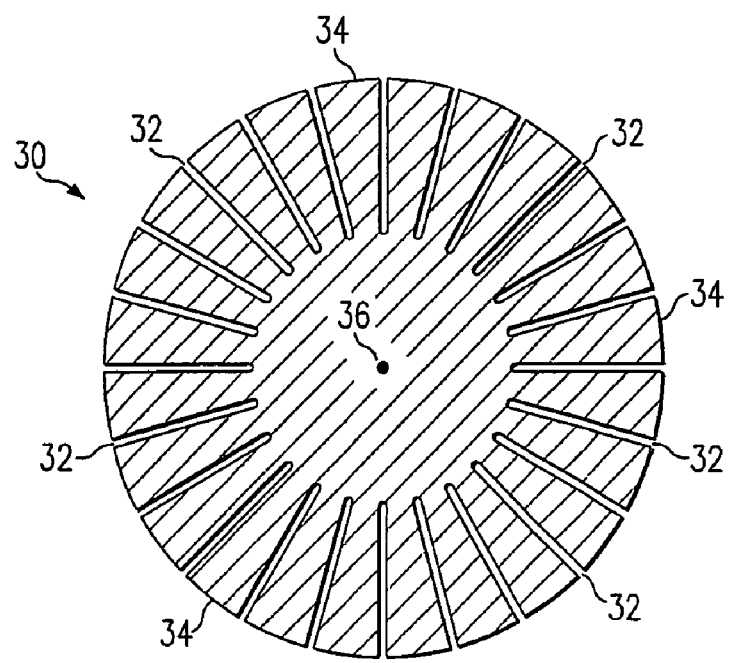
FIG. 4 includes an illustration of a cross-sectional view of a flow restrictor of FIG. 3.
Figure 5:
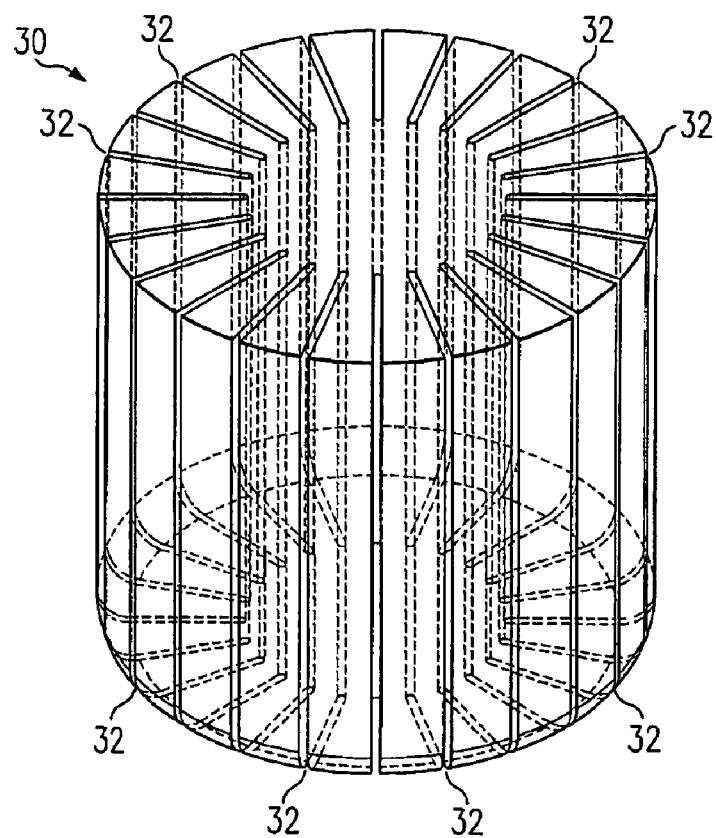
FIG. 5 includes an illustration of a partial cut-away view of a flow restrictor of FIG. 3.

FIG. 4 includes an illustration of a cross-sectional view of a portion of the flow restrictor 30. As illustrated more clearly in FIG. 4, the slots 32 extend from the outer surface 34 towards the center point 36. The slots 32 are substantially perpendicular to the centerline. FIG. 5 includes a partial cut-away view of the flow restrictor 30 illustrating that the slots 32 extend along the entire length of flow restrictor 30.

Figure 6:
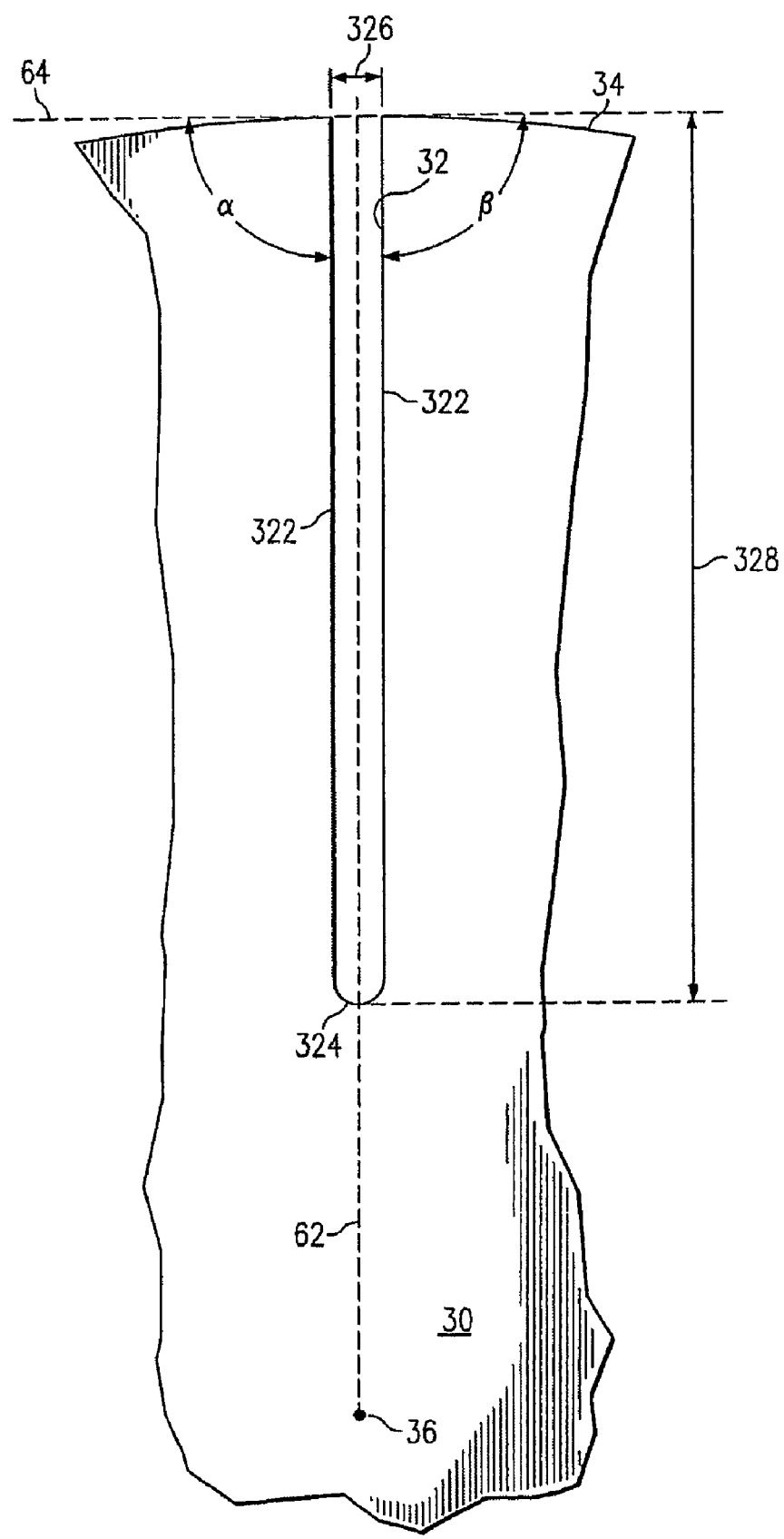
FIG. 6 includes an illustration of an enlarged, cross-section view of a slot extending from an outer surface into the flow restrictor of FIG. 3.

FIG. 6 includes an illustration of an enlarged, cross-sectional view of a portion of a flow restrictor 30 to show some of the details of slot 32. Slot 32 includes side surfaces or walls 322 and a substantially rounded bottom surface 324. The slot 32 can be formed along dashed line 62. Dashed line 62 starts at center point 36 and extends beyond the outer surface 34. Dashed line 64 represents a line substantially tangent to the flow restrictor 30 at a location corresponding to the middle of the slot 32. Dashed lines 62 and 64 are substantially perpendicular to each other. In this particular embodiment, the walls 322 are substantially parallel to each other and the dashed line 62. Each of α and β are substantially 90 degrees, and therefore, the depth 328 of the slot 32 is substantially normal to the outer surface 104 at a point from which it extends. Slot 32 may have an aspect ratio (depth 328:width 326) of at least approximately 5:1, and usually, is in a range of approximately 10:1 to 100:1.

In one non-limiting example, slot 32 may have a width in a range of approximately 50–5000 microns, and a depth 328 in a range of approximately 150–25,000 microns. After reading this specification, skilled artisans will appreciate that the width 326 and depth 328 may have values outside the ranges given. Regardless of the actual dimensions used for width 326 and depth 328, the aspect ratio should still be at least approximately 5:1.

The flow restrictor 30 may be tapered along its length. Referring to FIG. 6, the length is substantially perpendicular to the dashed lines 62 and 64 (i.e., a direction that goes into and comes out of the illustration shown in FIG. 6). The depth of the slots 32 may be substantially the same along the length the flow restrictor 30. In another embodiment, the bottom surface of the slots 32 may be kept at approximately a constant distance from the central axis of the flow restrictor 30. In this embodiment, with the tapered outer surface 34, the depth of the slots 32 may be deeper near the wider end of the flow restrictor 30 compared to the narrower end of restrictor 30. In still other embodiments, the depth or width of the slots may vary in other manners. Additionally, the slots 32 may have walls 322 that are not parallel to each other but form a slot 32 with a slight taper. In this particular embodiment, α, β, or both may be greater than 90 degrees. Additionally, the top corners of the slots near the outer surface 34 may be rounded.

The slots may be formed using an electrical discharge machine ("EDM"). With EDM, the depth of the slots may be substantially uniform across the length of the flow restrictor 30. In another embodiment, a diamond saw or other blade may be used to cut the slots. In this embodiment, the bottom surface of the slots may substantially flat. The mechanical means may be good for forming slots with bottom surface located a substantially constant distance from a central axis. After reading this specification, skilled artisans appreciate that (1) EDM may be used to form slots having substantially uniform depths along the lengths of the slots, (2) the mechanical means may be used to form slots with substantially constant distance from the central axis, and (3) etching or other methods may be used to form the slots.

Figure 7:
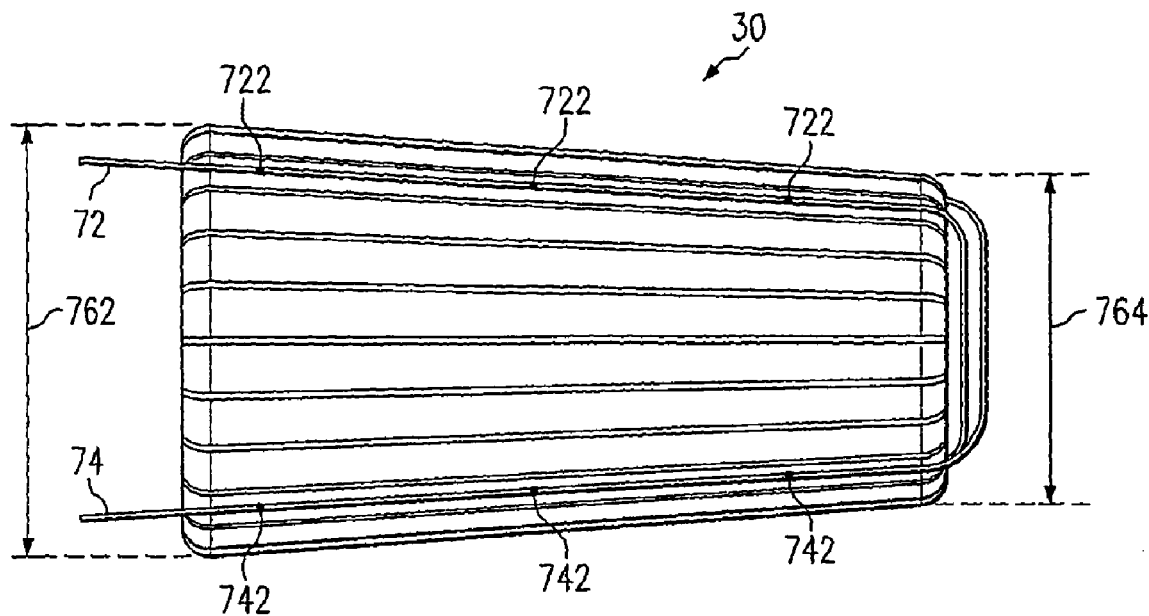
FIG. 7 includes an illustration of a side view of a flow restrictor of FIG. 3 having wires welded to the outer surface of the flow restrictor.

FIG. 7 includes a side view of a flow restrictor 30 after attaching wires 72 and 74 using spot welds 722 and 742, respectively. The flow restrictor 30 may have a diameter (width) 762 at one end that is larger than the diameter (width) 764 at the other end of the restrictor 30 as illustrated in FIG. 7. The taper of the width may be in a range of approximately 0.1 to 10 degrees.

The wires 72 and 74 extend along the length of the flow restrictor 30, cross each other at the narrower end of the flow restrictor 30, and extend along the opposite side of the flow restrictor 30 (not shown). Although not illustrated, the other ends of the wires 72 and 74 also extend beyond the wider end of the flow restrictor 30. The wires 72 and 74 can have a diameter in a range of approximately 50–1300 microns, and usually, in a range of approximately 150–400 microns. The wire can aid in the alignment of the restrictor 30 within a tube and can offset the restrictor 30 from the inner wall of a tube in which it is to reside. A more detailed discussion of the wires during an insertion operation is later in this specification.

Figure 8:
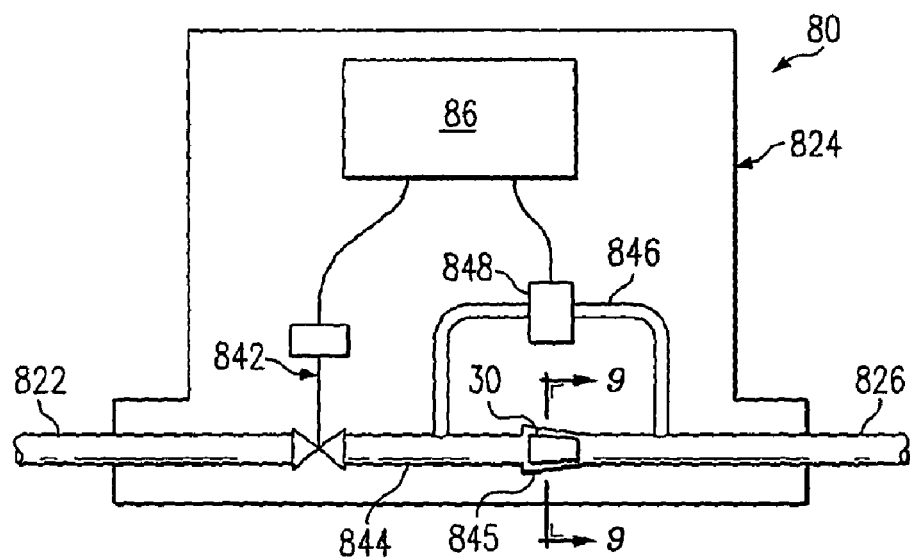
FIG. 8 includes an illustration of a schematic diagram of a mass flow controller including a flow restrictor in accordance with one embodiment.

FIG. 8 includes a schematic view of a mass flow controller 80 including an inlet 822, a main body 824, and an outlet 826. The main body 824 can include a primarily flow path 844 and a secondary flow path 846. The flow restrictor 30 lies within a tapered portion 845 of the primary flow path 844 The inner wall of portion 845 defines the taper, and the outer surface 34 of flow restrictor 30 has a shape that corresponds to the taper of portion 845 (i.e., effectively parallel to each other). Secondary flow path 846 typically has a smaller diameter compared to the primary flow path 844. The secondary flow path 846 provides a parallel flow path to the primary flow path and can be used to measure the flow of the gas through the mass flow controller 80. A controller 86 is connected to a valve 842 and a sensor 848.

Figure 9:
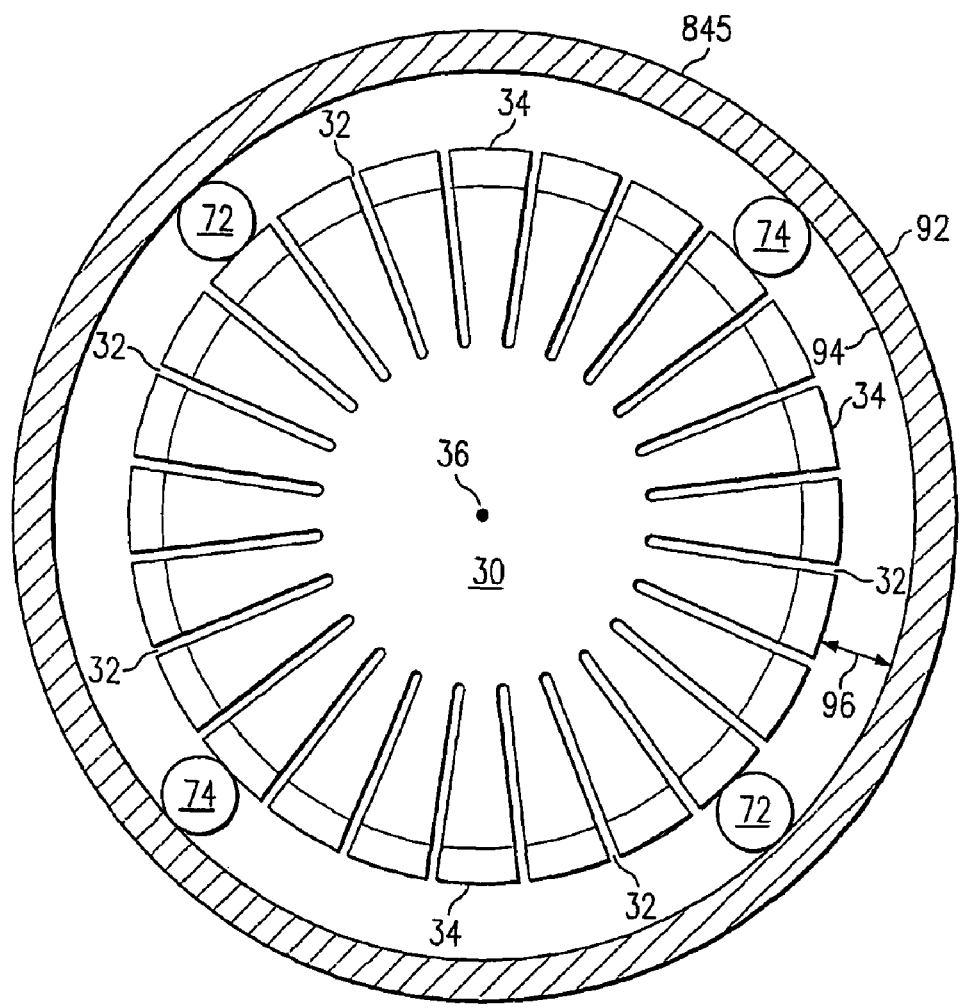
FIG. 9 includes an illustration of a cross-sectional view of the mass flow controller of FIG. 8 within the tapered portion of the mass flow controller.

Depending on the flow rate through a mass flow controller 80, the annular area between the restrictor 30 and the tapered portion 845 can be adjusted for that flow rate. Referring to FIG. 9, the portion 845 has an outer wall 92 and an inner wall 94. The flow characteristics in the annular area between the outer surface 34 of the restrictor 30 and the inner wall 94 of the tapered portion 845 are a function of the distance 96. Initially, the distance 96 is approximately the same as the diameters of the wires 72 and 74. During an insertion operation, as the pressure used to insert the restrictor 30 into the tapered portion 435 increases, the wires 72 and 74 can start to flatten and reduce distance 96. Therefore, the wires 72 and 74 may comprise a material that is softer than the materials used for the restrictor 30 and tapered portion 435. Exemplary materials may include plastics, malleable metals (e.g., nickel, stainless steel, etc.), and the like. In some situations, the force used during insertion may be approximately 500 newtons or several hundred pounds. In this manner, the mass flow controller 80 can be tuned to the mass flow rate for which it is designed by varying the pressure used during the insertion exercise.

The flow of fluids by the restrictor may also be affected by changing the design of the restrictor 30 and width of the wires 72 and 74. The wires 72 and 74 can provide an annulus between the flow restrictor 30 and the tapered inner wall of portion 845. If the ratio of the flow rate through the primary flow path 844 needs to be increased relative to the flow rate through flow path 846, the wires 72 and 74 may have a larger diameter, the slots 32 in the restrictor 30 may be wider or deeper, or the number of slots 32 in the flow restrictor 30 may be increased. If the ratio of the flow through the primary flow path 844 is to be decreased relative to the secondary flow path 846, a smaller diameter of wires 72 and 74 may be used, the slots 32 may be the narrower for shallower, or the number of slots 32 in the flow restrictor 30 may be decreased.

In one particular embodiment, a combination of methods can be used to adjust the flow around a restrictor. For example, the number of slots may be used as a coarse adjustment, and the insertion pressure may be used as a fine adjustment.

EXAMPLE

A specific non-limiting example is given to illustrate some dimensions and design considerations. A mass flow controller has a nominal flow rating of 30 standard liters per minute for nitrogen ($N_2$) gas. The flow restrictor may have an overall length of approximately 19 millimeters and a larger width of approximately 9.8 millimeters. The taper is approximately 2 degrees overall. The flow restrictor can have 24 slots with each slot having a depth of approximately 3200 microns and width of approximately 250 microns. The aspect ratios for the slots are approximately 13:1. Wires may be attached to the flow restrictor, and each wire may have a diameter of approximately 200 microns. After preparing the restrictor and wires, the combination may be inserted into the mass flow controller. The rest of the fabrication and calibration of the mass flow controller can be performed using a conventional method.

The flow restrictor 30 may be used in nearly any flow apparatus including a mass flow controller, mass flow meter, or any other device that controls, measures, or regulates the flow of fluids, whether gasses or liquids.

Figure 1:
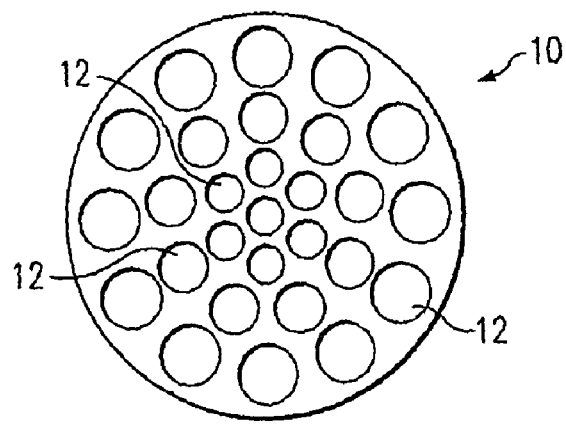
FIG. 1 includes an illustration of a cross-sectional view of a flow restrictor having generally circular, cylindrical holes.
Figure 2:
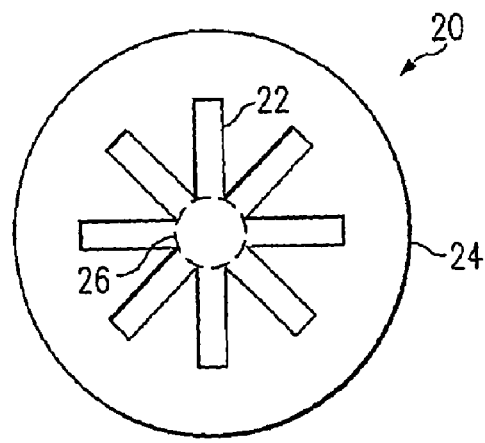
FIG. 2 includes an illustration of a cross-sectional view of a flow restrictor having internal slots and a central tube along a center axis of the flow restrictor.

The flow restrictor 30 has advantages over the conventional flow restrictors as illustrated in FIGS. 1 and 2. Flow restrictor 30 does not have circular, cylindrical holes 12 as seen in FIG. 1 and the central tube 26 in FIG. 2. The flow restrictor 30 can be designed to increase the pressure loses due to viscous losses in the primary flow path and to decrease pressure loses due to entrance and exit effects through the slots 32. The design increases the restrictor fluid wetted surface area and thicknesses of boundary layers. Unlike the circular openings 12 or central tube 10, the flow restrictor 30 with its external slots can be designed to achieve laminar flow by keeping the local Reynolds numbers (within slots 32) below those at which turbulence occurs.

Further, the slots 32 that extend to the outer surface 34 are less likely to have their shapes changed with changes in pressure unlike the flow restrictor in FIG. 2, which may have its slots significantly change with pressure changes. Because the slots 32 have depths 328 oriented normal to the outer surface 34 when the flow restrictor 30 is pressed into a machined pipe inlet, the slots 32 should remain undeformed and the conductance of the restrictor is only adjusted by changing the insertion pressure and wire shape. While the use of interior holes in FIG. 1 increases the flow for a given pressure differential across a flow restrictor, the internal hole can reduce the adjustability of the restrictor proportionate to the amount of flow diverted to the interior holes versus the outer annulus. The present design maintains the same ratio of adjustability.

The flow restrictor 30 can be used to change the flow ratio between the primary and second flow paths 844 an 845. Different variables as previously described can be used to achieve the desired flow ratios for the designed flow conditions (e.g., gas, pressure, total flow rate, etc.)

Figure 10:
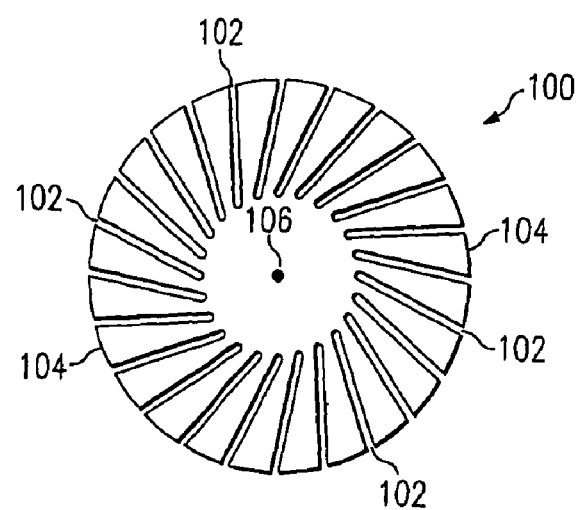
FIG. 10 includes an illustration of a cross-sectional view of an alternative flow restrictor having slots extending from and substantially normal to an outer surface of the flow restrictor.

FIG. 10 includes an alternative embodiment in which slots 102 extend from an outer surface 104 to a location closer to but not directly towards the center point 106. In other words, the depths of the slots 102 are not normal to the outer surface 104 from which they extend. Also, the slots 102 are not substantially perpendicular to the centerline. The bottom surfaces of the slots may be substantially the same distance from a central axis. Similar to flow restrictor 30, the flow restrictor 100 does not have the interior holes 12 or the central tube 26.

When the flow restrictor 100 is pressed into a machined pipe inlet, the slots 102 may deform as more force is applied and decrease the width of the slots 102 near the outer surface 104. This change in dimension changes the fluid conductance of the restrictor such that the flow restrictor 100 is adjustable on the exterior of the flow restrictor 100 through the deformation of the attached wires as well as through the deformation of the slots 102.

In yet another embodiment, the flow restrictor may be used in other fluid flow applications. For example, the flow restrictor may be used to divert some of a liquid stream from a primary flow path to a secondary flow path. The concepts described herein can be used to design properly the flow restrictor with slots extending from an external surface of the flow restrictor.

In a further alternative embodiment a different number of wires (similar to wires 72 and 74) may be used. For example, instead of four wire lengths along the flow restrictor only three wire lengths may be used. Also, more wire lengths may be used, but the amount of area that they occupy may become greater than desired. In yet a further alternative embodiment, no wires are required.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention of claimed is:

1. A flow restrictor comprising:
   a material, wherein the material has a first end and a second end; and
   a first slot having a depth that extends from an outer surface of the material to a location closer to a center point within the material and a length that extends from the first end to the second end, wherein the first end and the second end are substantially flat;
   wherein the first slot has an aspect ratio of at least approximately 5:1.

2. The flow restrictor of claim 1, wherein:
   the material has a substantially circular cross-sectional area;
   the flow restrictor comprises a plurality of slots including and substantially identical to the first slot; and
   each of the slots has a depth that is substantially normal to the outer surface.

3. The flow restrictor of claim 1, wherein:
   the material has a substantially circular cross-sectional area;
   the flow restrictor comprises a plurality of slots including and substantially identical to the first slot; and
   each of the slots has a depth that is not normal to the outer surface.

4. The flow restrictor of claim 1, wherein the first slot has walls that are substantially parallel to each other.

5. The flow restrictor of claim 1, wherein the first slot has an aspect ratio in a range of approximately 10:1 to 100:1.

6. The flow restrictor of claim 1, wherein the first slot has a width in a range of approximately 50–5000 microns.

7. The flow restrictor of claim 1, wherein the first slot has a length in a range of approximately 150–25,000 microns.

8. The flow restrictor of claim 1, wherein:
   the first end is significantly wider than the second end; and
   the first slot has substantially the same depth at the first and second ends.

9. The flow restrictor of claim 1, wherein the flow restrictor has a centerline and the first slot is substantially perpendicular to the centerline.

10. The flow restrictor of claim 1, wherein the flow restrictor has a centerline and the first slot is not substantially perpendicular to the centerline.

11. An apparatus comprising:
    a first flow path; and
    a flow restrictor lying within a first portion of the first flow path, wherein the flow restrictor comprises:
    a material, wherein the material has a first end and a second end; and
    a first slot having a depth that extends from an outer surface of the material to a location closer to a center point within the material and a length that extends from the first end to the second end, wherein the first and the second end are substantially flat;
    wherein the first slot has aspect ratio of at least approximately 5:1.

12. The apparatus of claim 11, wherein:
    the material has a substantially circular cross-sectional area;
    the flow restrictor comprises a plurality of slots including and substantially identical to the first slot; and
    each of the slots has a depth that is substantially normal to the outer surface.

13. The apparatus of claim 11, wherein:
    the material has a substantially circular cross-sectional area;
    the flow restrictor comprises a plurality of slots including and substantially identical to the first slot; and
    each of the slots has a depth that is not normal to the outer surface.

14. The apparatus of claim 11, wherein the first slot has walls that are substantially parallel to each other.

15. The apparatus of claim 11, wherein the first slot has an aspect ratio in a range of approximately 10:1 to 100:1.

16. The apparatus of claim 11, wherein the first slot has a width in a range of approximately 50–5000 microns.

17. The apparatus of claim 11, wherein the first slot has a length in a range of approximately 150–25,000 microns.

18. The apparatus of claim 11, wherein:
    the first end is significantly wider than the second end; and
    the first slot has substantially the same depth at the first and second ends.

19. The apparatus of claim 11, wherein a wire lies between an inner wall of the first flow path and the flow restrictor.

20. The apparatus of claim 11, wherein the first portion of the first flow path has a taper and the flow restrictor has an outer surface that corresponds to the taper.

21. The apparatus of claim 11, further comprising a second flow path that comprises a second portion that provides for a parallel flow path to the first portion of the first flow path.

22. The apparatus of claim 11, wherein the flow restrictor has a centerline and the first slot is substantially perpendicular to the centerline.

23. The apparatus of claim 11, wherein the flow restrictor has a centerline and the first slot is not substantially perpendicular to the centerline.

24. A mass flow apparatus comprising:
    a first flow path;
    a flow restrictor lying within a first portion of the first flow path, wherein the flow restrictor comprises:
    a material that has a substantially smooth outer surface, a first end positioned upstream in said first flow path, a second end, a substantially cross-sectional area, and a plurality of slots, wherein each of the slots has a depth that extends from the outer surface of the material towards a center point of the cross-sectional area and a length that extends from the first end to the second end of the material, and wherein the first end and the second end are substantially flat; and
    a second flow path that comprises a second portion that provides for a parallel flow path to the first portion of the first flow path within the mass flow controller, wherein the second flow path is smaller than the first flow path and is coupled to a sensor;

wherein wire lengths lie between an inner wall of the first flow path and the flow restrictor.

25. The mass flow apparatus of claim 24, wherein the first portion of the first flow path has a taper and the flow restrictor has an outer surface that corresponds to the taper.

26. A flow restrictor comprising:

a material, wherein the material has a circular cross-sectional area and a first end and a second end;

a plurality of slots substantially identical to one another and having a depth that extends from an outer surface of the material to a location closer to a center point within the material in a direction that is not normal to the outer surface, and a length that extends from the first end to the second end, wherein the first end and the second end are substantially flat.

* * * * *